June 10, 1924.
A. J. LOGUIN
1,497,337
METHOD OF MAKING DISK WHEELS AND PULLEYS
Filed Sept. 12, 1922   2 Sheets-Sheet 1
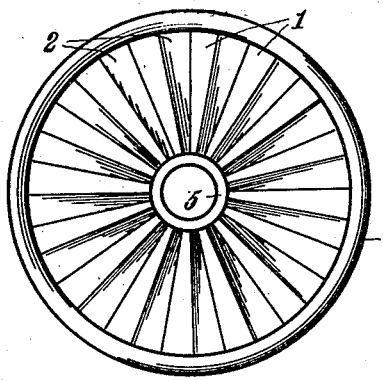
Fig. 1.
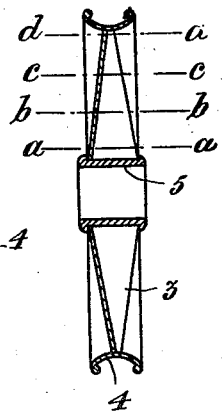
Fig. 2.
Fig. 3.
Fig. 4.
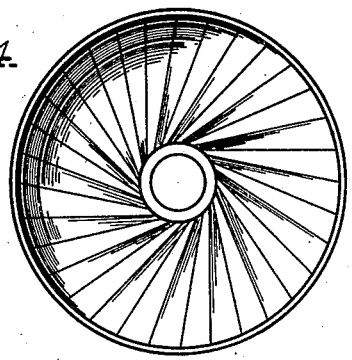
Fig. 5.
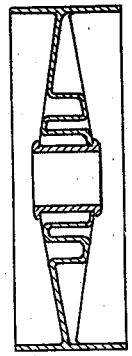
Fig. 6.   Fig. 7.   Fig. 8.
 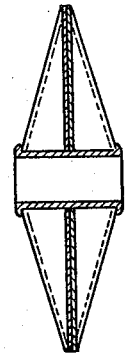 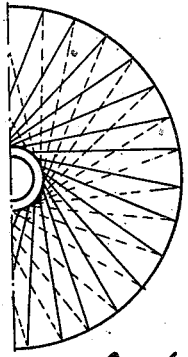
Inventor:
A. J. Loguin
By Markes Clerk
Atty's

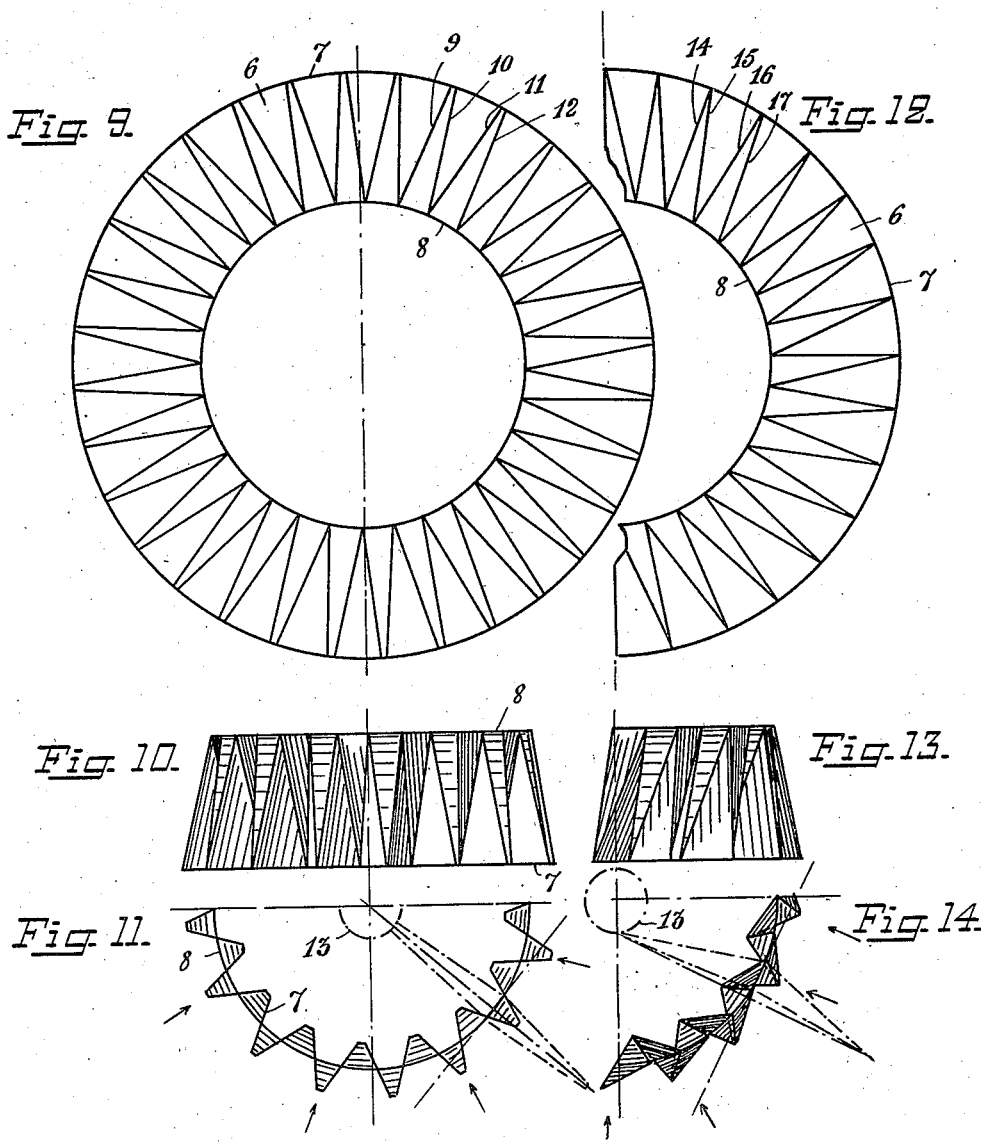

Patented June 10, 1924.

1,497,337

UNITED STATES PATENT OFFICE.

ALEXANDER JOSEFOVITCH LOGUIN, OF STOCKHOLM, SWEDEN.

METHOD OF MAKING DISK WHEELS AND PULLEYS.

Application filed September 12, 1922. Serial No. 587,796.

*To all whom it may concern:*

Be it known that ALEXANDER JOSEFOVITCH LOGUIN, a citizen of Russia, residing at 24 Norr Mälarstrand, Stockholm, Sweden, has invented certain new and useful Improvements in Methods of Making Disk Wheels and Pulleys, of which the following is a specification.

The invention relates to an improved construction of disk wheels, pulleys and the like the web of which is made of sheet metal provided with spoke-like substantially radial corrugations to impart rigidity to the web. It has been suggested to make such disks out of flat rectangular or arc-shaped sheets, which are corrugated and the opposite ends of which are joined by riveting or welding so as to form a corrugated ring-shaped body. One object of the present invention is to make such corrugated disks without any joint or seam that would require riveting or welding. To this end the disk is made out of a flat seamless sheet in the form of a circular ring which is corrugated, while at the same time the corrugations are pressed together at the outer edge of the sheet and pushed towards the centre of the disk, so that the outer edge will be located at the hub, whereas the inner edge will form the circumference of the disk, after the corrugated sheet has been turned in this way outside in.

The invention has also for its object to facilitate the manufacturing of such wheels by giving the corrugations a form which only requires bending of the sheet without the fibres of the material being stretched and compressed as in a pressing operation. For this purpose the sheet is folded according to the invention so as to form sides of elongated tetrahedrons which are supposed to be arranged close to each other between the hub and the tyre with their inner edges parallel with the axis of the wheel and with their outer edges located in the central plane of the wheel. The corrugations will thus form quite plane surface elements and may therefore be produced simply by folding or bending a flat sheet along straight lines. As the material is not subjected to any pressing operation the corrugated disk will have its original thickness throughout. The corrugations thus produced will increase in width towards the hub and by varying the number of corrugations the latter may be given any wanted width to conform with the length of the hub in different cases. The wheel will thereby also obtain the required strength and rigidity in an axial direction.

Another object of the invention is to increase the strength of the corrugations with respect to the transmission of torsional forces. This may be attained by disposing the corrugations substantially tangentially to the hub or an inner concentric circle. The latter arrangement is contemplated particularly for pulleys and driving wheels of motor cars.

The invention will be more closely described with reference to the accompanying drawings, in which Fig. 1 shows an automobile wheel with radial corrugations. Fig. 2 is a cross section of said wheel. Fig. 3 shows partial sections of the wheel along concentric cylindrical surfaces $a-a$, $b-b$, $c-c$ and $d-d$ in Fig. 2. Figs. 4 and 5 show a side view and a cross section respectively of a pulley having corrugations disposed tangentially to the hub. Fig. 6 is cross section of a web composed of two disks with radial corrugations. Figs. 7 and 8 show a cross section and a side view respectively of another construction of a double web. Figs. 9, 10 and 11 illustrate the method of making a wheel disk of the type shown in Figs. 1 and 2, and Figs. 12, 13 and 14 illustrate the method of making a disk according to Figs. 4 and 5.

In the construction shown in Figs. 1 and 2 the corrugations consist partly of plane surface elements 1, 2 forming equilateral triangles having their bases located at the tyre 4 in the central plane of the wheel and their vertices alternately at opposite ends of the hub 5, and partly of surface elements 3 which form equilateral triangles lying in different radial planes and having their bases turned against the hub and their vertices against the tyre. Thus, the corrugations form sides of a series of elongated tetrahedrons supposed to be arranged close to each other radially about the hub. Each tetrahedron is open at one side and the open and closed sides alternate with one another at opposite sides of the disk.

The construction shown in Figs. 4 and 5 differs from that of Figs. 1 and 2 only by the corrugations being disposed tangentially to the hub instead of radially.

The method of making a disk according to Figs. 1 and 2 appears from Figs. 9, 10 and 11. The blank consists of a seamless sheet of metal 6 in the form of a flat circular ring confined by two concentric circles 7, 8, Fig. 6. To form the corrugations the disk is first divided by straight lines 9, 10, 11, 12 etc. into an even number of surface elements. The disk is then bent or folded along said lines, in one direction along two adjacent lines 9, 10 and in the opposite direction along the next pair of lines 11, 12 and so on.

When manufacturing on a large scale this operation is, of course, performed in automatic machines, which would not require a previous dividing of the disk and drawing of the lines along which the sheet is to be folded.

This folding being properly done the disk will assume approximately the shape shown in Fig. 10, in which the edge 8 corresponding to the inner circle in Fig. 9 has its original circular form, while the edge 7 has the form of a zig-zag line (Fig. 11).

If now the edge 7 is pushed inwards by means of suitable implements, as indicated by arrows in Fig. 11, while the edge 8 is forced to maintain its circular form, for instance by means of a rig, the zig-zag edge will eventualy take up the position indicated by the inner circle 13 drawn in chain lines in Fig. 11. The hub is then inserted in the central opening thus formed and secured to the disk, the hub being preferably adapted to fit exactly in said opening so as to form a rigid connection.

The method of making a disk according to Figs. 4 and 5 is much the same as that described, as will appear from Figs. 12, 13 and 14. The flat disk 6 is divided as before into an even number of surface elements and lines 14, 15, 16, 17 are drawn in the way shown in Fig. 12 so as to form oblique or irregular triangles instead of equilateral ones. The disk is then folded alternately in one direction along lines 14, 15 and in the opposite direction along lines 16, 17. The disk will thereby assume the shape shown in Fig. 13, which is similar to that of Fig. 10 except that the disk is somewhat twisted. The plan view of Fig. 14 also shows that the corrugations differ from the corrugation in Fig. 11 only by being inclined to one side.

The zig-zag edge is now forced inwardly in the direction of the arrows, Fig. 14, while the circular edge is caused to maintain its circular form. The corrugations are then squeezed up at the zig-zag edge so that, when brought to the position indicated by the circle 13, the corrugations will be lying close together at the inner edge. The hub is then inserted and secured to the zig-zag edge of the disk as before.

It will be seen from the foregoing that, principally, the method consists in folding a flat ring-shaped disk at the outer edge while turning the disk outside in so that the outer edge will finally be located inside. This folding operation will require only a very small amount of energy as the sheet is not stretched or compressed otherwise than along straight lines. From the same reason the turning of the disk about its inner edge is just as easy. Besides, the turning of the disk outside in about the inner edge is a quite natural process and it will therefore, take place without cracking of the edge, even if the material should be somewhat brittle.

In Figs. 11 and 14 a surface element is shown in chain lines in its original outer and its final inner position, and it appears that these elements are turned, during the folding operation, about the corresponding part of the inner edge.

If required, the wheel or pulley may be provided with double webs of the kind described, as shown in Figs. 6, 7 and 8. Two disks with radial corrugations may be combined in the manner shown in Fig. 6, the disks being slid axially into each other so that the corrugations of one disk will be located inside the corrugations of the other disk at the hub. Figs. 7 and 8 show a combination of two disks having corrugations disposed tangentially to the hub, the corrugations of the two disks being twisted in opposite direction so that they are crossing each other, as shown in Fig. 8. This construction particularly affords great strength for the transmission of heavy torques.

Having now particularly described my invention, what I claim is:

1. A method of manufacturing disks for wheels or pulleys consisting in corrugating a flat ring-shaped sheet by folding it along straight lines while squeezing up the corrugations at the outer edge and turning the ring outside in so that the outer edge will be located at the hub, whereas the inner edge will form the circumference of the disk.

2. A method as claimed in claim 1 in which the sheet is folded so as to form corrugations disposed substantially tangentially to the inner circle of the sheet.

3. A method of manufacturing disks for wheels or pulleys consisting in corrugating two flat annular sheets by folding each sheet along straight lines to form corrugations disposed substantially tangentially to the inner circle of the sheet while squeezing up the corrugations at the outer edge, turning each ring outside in so that the outer edge will be located at the hub and the inner edge will form the circumference, and arranging the formed sheets side by side with the corrugations of one sheet extending in a direction opposite to the corrugations of the other sheet.

In testimony whereof I affix my signature in presence of two witnesses.

ALEXANDER JOSEFOVITCH LOGUIN.

Witnesses:
S. SWENSON,
L. BERGVNHIEDE.